United States Patent [19]
Guy

[11] 4,262,200
[45] Apr. 14, 1981

[54] DETECTORS, AND ENVELOPE ARRANGEMENTS AND MOUNTS FOR DETECTORS

[75] Inventor: Eric C. Guy, Fordingbridge, England
[73] Assignee: U.S. Philips Corporation, New York, N.Y.
[21] Appl. No.: 47,613
[22] Filed: Jun. 11, 1979

[30] Foreign Application Priority Data
Jun. 21, 1978 [GB] United Kingdom ............... 27443/78

[51] Int. Cl.³ ............................................. G01J 1/00
[52] U.S. Cl. .................................... 250/352; 62/264; 62/DIG. 9; 250/338
[58] Field of Search ....................... 250/352, 261, 338; 62/264, 267, 298, DIG. 9

[56] References Cited
U.S. PATENT DOCUMENTS

| | | | |
|---|---|---|---|
| 2,951,944 | 9/1960 | Fong | 250/352 |
| 3,188,824 | 6/1965 | Geist et al. | |
| 3,602,714 | 8/1971 | Farmer et al. | 250/352 |
| 3,630,047 | 12/1971 | Turton | |
| 3,742,729 | 7/1973 | Zulliger | |
| 3,851,173 | 11/1974 | Taylor et al. | 250/352 X |
| 3,894,403 | 7/1975 | Longsworth | |
| 3,942,010 | 3/1976 | Peterson et al. | 250/352 |

FOREIGN PATENT DOCUMENTS
2368675 of 0000 France.

Primary Examiner—Davis L. Willis
Attorney, Agent, or Firm—Marc D. Schechter

[57] ABSTRACT

An infrared detector and envelope arrangement for the detector have a novel mount (21,22,23,24) for a Joule-Thomson or other cooling element (10). The mount is a single unit (21,22,23,24) which includes an inner part (23) on which the cooling element (10) is mounted e.g. via an adaptor (30). The cooling element (10) is secured in a dewar (1,2) of the envelope arrangement by attaching an outer part (21,22) of the mount (21,22,23,24) to a dewar mount (13) e.g. by bolts (22). These inner and outer parts (23 and 21,22) which may have overlapping flanges (43,37 and 21, see FIGS. 2 to 6) are elastically coupled together by a resilient part (24) of the mount (21,22,23,24). The resilient coupling reduces movement and strain of the inner dewar wall (1) caused by movement of the cooling element both during assembly and use of the detector. A fluid inlet (51,52) may be present on the outer part (22,21), and a flexible pipe (11) may extend between the outer and inner parts (21,22 and 23) to connect the inlet (51,52) to the cooling element (10). (FIG. 1).

9 Claims, 11 Drawing Figures

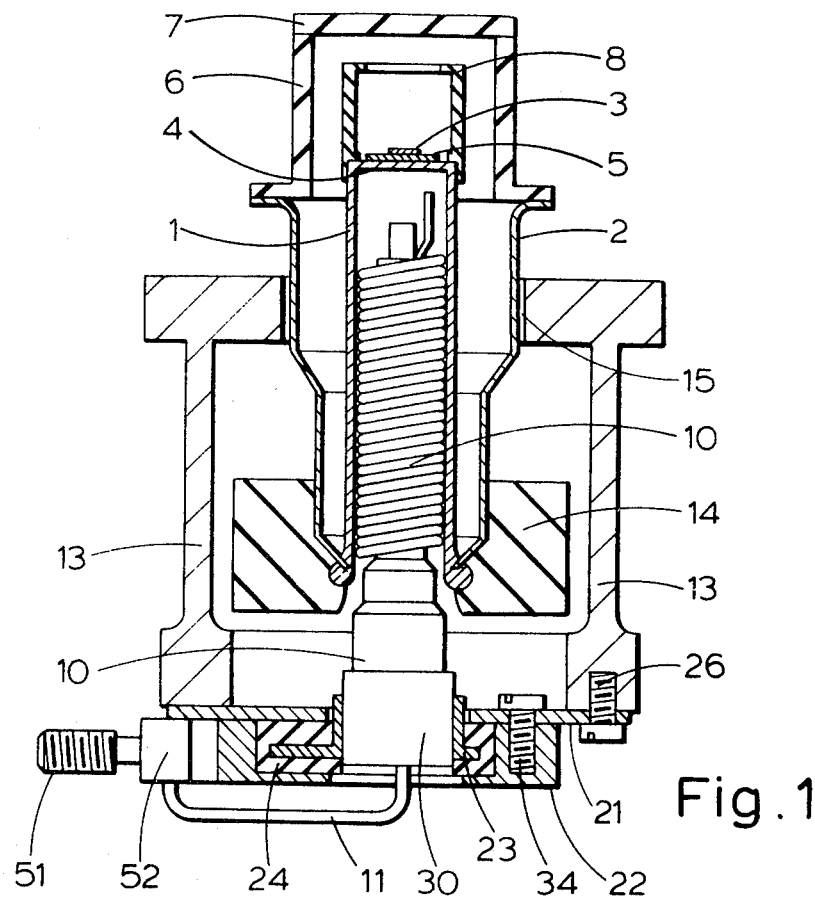
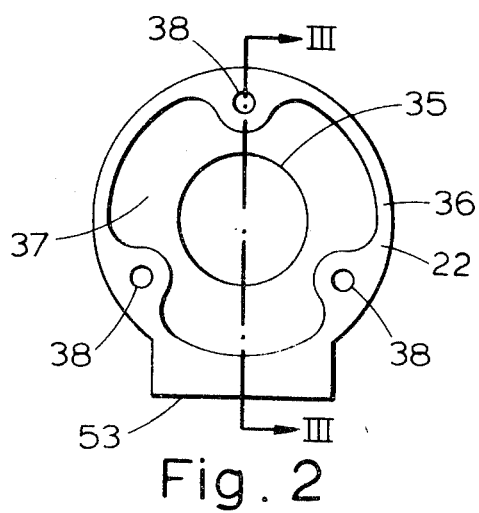
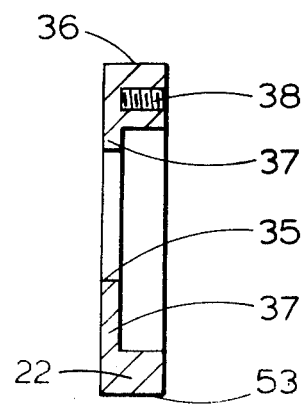
Fig. 1
Fig. 2
Fig. 3

DETECTORS, AND ENVELOPE ARRANGEMENTS AND MOUNTS FOR DETECTORS

BACKGROUND OF THE INVENTION

The invention relates to envelopes for infrared detectors, to detectors comprising such envelopes and to mounts for cooling elements for use in such envelopes and detectors.

U.S. Pat. No. 2,951,944 describes an envelope for an infrared detector comprising a mounting area in a dewar for mounting at least one detector element for detecting infrared radiation, and an elongate cooling element insertable in the dewar so as to extend towards said mounting area for cooling the detector element during operation. The dewar is at least partially accommodated in a dewar mount, and mounting means are present for securing the cooling element in the dewar. The cooling element and dewar are used to maintain the detector element at a temperature in the cryogenic range so as to obtain more efficient operation of the detector. The cooling element described is of the type which uses the well known Joule-Thomson effect to bleed or throttle the flow of certain types of gases such as dry air, nitrogen, argon, hydrogen, or helium and produce a cryogenic refrigerating effect by expansion of the gas. The transverse dimensions of such a cooling element are usually such that it is a close-fit in the chamber defined by the inner wall of the dewar.

In the evacuated space between the inner and outer walls of the dewar the detector element or element array is mounted on the end face of said inner wall. The elongate cooling element therefore extends to the vicinity of this end face from the mouth of the dewar.

When in use the free end of such a cooling element may tend to move in such a dewar as a result of vibrations in the detector environment and/or of forces caused by, for example, rapid acceleration. The inner wall of the dewar may consist of glass having a thickness of for example 0.5 mm. Particularly when the cooling element is a close fit in the dewar chamber such movement of the cooling element can force the inner end wall of the dewar to move beyond acceptable limits so resulting firstly in undesirable movement of the detector element in the optical field and in an extreme case undesirable straining and cracking of the glass walls of the dewar. Similar straining and cracking of the glass dewar can also occur when inserting and securing the cooling element in the dewar.

In the arrangement known from U.S. Pat. No. 2,951,944, the cooling element mounting means comprises a solid mass of potting compound such as epoxy resin which fills the space between the dewar-mount and the mouth of the dewar. In order to prevent movement of the cooling element relative to the dewar, the cooling element is embedded rigidly in the envelope arrangement by the epoxy resin penetrating and filling the space between the inner wall of the dewar and a metal jacket of the cooling element, except over a short distance from the inner end face of the dewar. This extra metal jacket is necessary to provide a return path for the coolant fluid through the epoxy resin and out from the detector.

However such a mounting has several problems and disadvantages. It is not effective in reducing straining of the dewar when the cooling element is being inserted and secured during assembly of the detector. Due to a difference in thermal expansion coefficients such a large filling or epoxy resin can strain and crack the glass of the dewar either during assembly or in use. If during assembly the cooling element is incorrectly mounted (for example by being spaced incorrectly from the mounting area of the detector element) the whole of the expensive detector envelope arrangement is wasted, because the cooling element which was so thoroughly embedded therein cannot be removed readily. The epoxy resin filling and the metal jacket around the cooling element both of which extend close to the detector element area constitute a significant thermal path and a significant thermal mass. This reduces the speed with which the detector operating temperature can be achieved in this area and/or can require the provision of a larger supply of the coolant fluid than would otherwise be necessary. Furthermore the inner wall of the dewar which is fastened to the cooling element by the epoxy resin may still move and vibrate relative to the outer wall of the dewar during use of the detector, and this movement can still strain the glass of the dewar and vibrate the detector in the optical field.

The arrangement described in U.S. Pat. No. 2,951,944 has a conventional fitting for the fluid connection to the cooling element. Such a fitting is a long flexible metal pipe, a free end of which is connected, in use, to a remote supply of the fluid used for cooling the detector element or elements. The pipe may have a wall thickness of for example 0.15 mm. and an inner diameter of for example 0.5 mm. The length of the pipe may be for example, several centimeters or even several tens of centimeters. Such a long flexible pipe can be damaged comparatively easily.

SUMMARY OF THE INVENTION

According to one aspect of the present invention an envelope for an infrared detector comprises a mounting area in a dewar for mounting at least one detector element for detecting infrared radiation, an elongate cooling element insertable in the dewar so as to extend toward said mounting area for cooling the detector element during operation, a dewar mount in which the dewar is at least partially accommodated, and cooling element mounting means for securing the cooling element in the dewar, wherein the cooling element mounting means comprises a single unit having an inner part and an outer part which are elastically coupled together by an intermediate resilient part of the unit. The cooling element is mounted at said inner part, the unit being attachable to the dewar mount via the outer part, and the elastic coupling serving to control movements of the cooling element within the dewar.

Thus the invention provides a novel construction for the mounting of the cooling element, which because of its elastic coupling can reduce movement and strain of the inner wall of the dewar by reducing forces which the cooling element could exert on the dewar due to movement of the cooling element both during assembly and during use of the detector. The degree of flexibility in the cooling element mounting unit at the operating temperature of the detector can be accurately determined by the dimensions and properties of the resilient part and the outer and inner parts of the cooling element mounting. In particular, these dimensions and properties can be chosen so that during use of the detector the resilient part controls cooling element movements by both significantly dampening vibrations of the cooling element and their effect on the inner dewar wall and by tending to produce a counter movement. Because the mounting means is a single unit, it can be attached to the dewar mount in a simple operation and can be pre-tested. The elastic coupling in the unit provides flexibility in the mounting of the cooling element which can permit it to be inserted and secured without significantly straining the dewar even when, for example, small misalignments or small dimensional inaccuracies are present in the envelope arrangement. This can permit interchangeable mounting of different cooling elements in dewars of different detectors. Because the mounting unit is attached to the dewar-mount via its outer part, the effects of this attachment during assembly are isolated from the cooling element by the elastic coupling. This attachment between the mounting unit and the dewar mount may be effected by for example bolting, an advantage of which is that the unit can be readily detached again from the dewar mount if, for example, the cooling element had been incorrectly mounted. The use of a cooling element mounting unit in accordance with the invention does not require the introduction of significant thermal paths or thermal masses close to the detector element area so that rapid cooling of this area may be obtained without needing a large fluid supply. Neither a metal jacket nor an epoxy filling between the cooling element and the inner dewar wall are needed.

A flexible pipe may be connected to the cooling element for supplying fluid to the element. In a further aspect according to the invention, an inlet for the fluid is present on the outer part of the cooling element mounting unit, and the flexible pipe extends between the outer and inner parts to connect the inlet to the cooling element. Thus, when in use, the inlet may be connected to a remote fluid supply by another flexible pipe which has a greater wall thickness and is less susceptible to damage than the pipe between the outer and inner parts of the cooling element mounting unit.

According to another aspect of the invention there is provided an infrared detector comprising an envelope according to the invention, wherein between inner and outer walls of the dewar at least one detector element for infrared radiation is mounted on the end face of the inner wall, and the elongate cooling element mounted at the inner part of the element mounting unit extends towards the end face for cooling the detector element during operation.

According to a further aspect of the invention there is provided a cooling element mount, for an envelope according to the invention, comprising a single unit having inner and outer parts elastically coupled together by a resilient part of the unit. The inner part is adapted for mounting the cooling element thereon, and the outer part is adapted for attachment of the unit to the dewar-mount.

Embodiments of the various aspects of the invention will now be described, by way of example, with reference to the accompanying drawing to further illustrate these and other features of the invention and their advantages.

BRIEF DESCRIPTION OF THE DRAWINGS

FIG. 1 is a side view, partly in section, of an infrared detector comprising an envelope arrangement and a cooling element mount according to the invention.

FIG. 2 is a plan view of one member of the outer part of the cooling element mount shown in FIG. 1.

FIG. 3 is a cross-sectional view of the member shown in FIG. 2, taken on the line III—III of FIG. 2.

DESCRIPTION OF THE PREFERRED EMBODIMENTS

Figure 4:
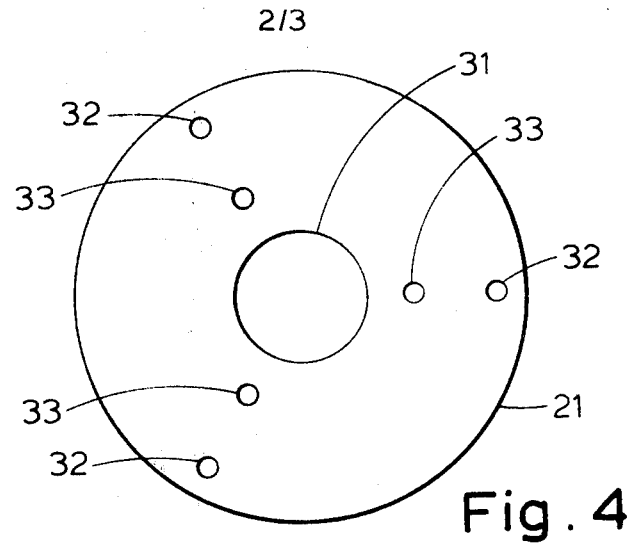
FIG. 4 is a plan view of the other member of the outer part of the cooling element mount shown in FIG. 1.

For the sake of clarity the various Figures are not drawn to scale. In addition, those parts of the apparatus which are not necessary for an understanding of how to make and use the invention have not been shown in the drawing. Such parts may be provided in known manner.

The detector of FIG. 1 comprises an envelope arrangement including a dewar 1, 2. In the evacuated space between the inner wall 1 and outer wall 2 of the dewar at least one detector element 3 for detecting infrared radiation is mounted on the end face 4 of the inner wall 1. The detector element 3 may be of known type and may be secured in known manner to a substrate 5 of for example alumina on the end face 4. The end face 4 thus constitutes a mounting area in the dewar 1, 2 for the detector element 3.

The dewar 1, 2 may be of known type. The inner wall 1 may be of glass the thickness of which may be for example 0.5 mm, and the outer wall 2 may be of for example metal. Although not shown in the drawing the inner glass wall 1 includes in known manner electrical conductors which are either on its outer surface or embedded in that surface. These conductors are electrically connected to electrodes of the detector element 3 adjacent the end face 4, extend along the length of the inner wall 1 and pass outside the dewar 1, 2 where they are electrically connected in known manner to external connections for the detector. The outer wall 2 of the dewar comprises an end portion 6, 7 which is not sealed to the remainder of the dewar 1, 2 until after mounting and connecting the detector element 3 at the end face 4. The end face 7 of the wall 2 consists of a window transparent to infrared radiation. A radiation shield 8 is also included around the detector element 3 in known manner. After sealing the end portion 6, 7 to the remainder of the outer wall 2 the space between the walls 1 and 2 is evacuated in known manner.

The inner wall 1 of the dewar defines an inner chamber into which an elongate cooling element 10 is inserted. Cooling element 10 extends towards the end face 4 for cooling the detector element 3 is known manner during operation of the detector. The cooling element 10 may be a known type of cryostat which is designed to utilize the refrigerating capability of the Joule-Thomson effect. This involves bleeding a fluid under pressure through a valve or other orifice into an area of lower pressure. When the fluid expands it absorbs heat in the low pressure area thus producing the cooling effect. The inner chamber of the dewar 1,2 adjacent the end face 4 constitutes the low-pressure area. The fluid, which may be for example dry air, nitrogen, argon, hydrogen or helium, is supplied to the cooling element 10 via a flexible metal pipe 11. This pipe 11 communicates with the helically-wound tubing of the element 10 so that the moving fluid progressively encircles the element 10 and finally escapes from the orifice at the free end of the element 10 adjacent the end face 4. As a result of its expansion during escape the fluid temperature is lowered until the desired level is reached. Before escaping through the open mouth of the dewar 1, 2, the cold fluid in the inner chamber circulates around the helical tubing of the element 10 so as to pre-cool the incoming fluid.

Applicant has fabricated such a detector in which the diameter of the inner chamber defined by the dewar wall is nominally 7.23 mm, and the outer diameter of the cooling element 10 is also nominally 7.23 mm. Such an element 10 is thus a very close-fit in the dewar.

The envelope arrangement of FIG. 1 also comprises a dewar-mount 13 in which the dewar 1, 2 is partially accommodated. The mount 13 may be of for example aluminium and may be partially filled with for example silicone rubber 14, particularly around the electrical connections for the detector element 3. The dewar 1, 2 is secured in the mount 13 by for example a suitable brazed joint 15 between the flange of the mount 13 and the outer wall 2 of the dewar. The filling 14 may also contact the dewar mount 13 to form a flexible connection between it and the outer wall of the dewar 1, 2.

The cooling element 10 is rigidly mounted on cooling element mount 21,22,23,24 which is detachably connected to the dewar mount 13 by bolts 26 of which only one is shown in FIG. 1. In this way the cooling element 10 is secured in the dewar 1,2. In accordance with the present invention this cooling element mount comprises an outer part 21,22 and an inner part 23 which are elastically coupled together by resilient material 24 to form a single unit. The cooling element 10 is mounted on an adaptor 30 at the inner part 23, while the bolt holes for attaching the cooling element mount to the dewar mount 13 are present in a plate member 21 of the outer part 21,22.

Both the inner and outer parts 23 and 21,22 of the cooling element mount may be of for example, aluminium or stainless steel. The inner and outer parts 23 and 21,22 are arranged coaxially along the longitudinal axis of the cooling element 10. The resilient material 24 may be, for example, any suitable elastomer such as silicone rubber 24 which may form (if desired) a bond with the surfaces of the members 21, 22 and 23. The composition and dimensions of the resilient material 24 can be chosen so that the free end of the cooling element 10 will not move by more than a prescribed amount due to the effects of vibration or rapid acceleration during use of the detector. In this way the strain imposed on the glass wall of the dewar 1, 2 by the cooling element 10 is reduced, and the extent of flexibility in the cooling element mount is determined precisely by its construction. The resilient material 24 also isolates from the dewar 1,2 the straining effects due to securing the cooling element mount to the dewar mount 13 by the bolts 26.

Under transverse vibration (i.e. vibration at right angles to the elongate cooling element 10) the dewar inner wall 1 and the inserted cooling element 10 tend to rotate about a point just inside the mouth of the dewar 1,2. The elastomer member 24 serves to restrain this rotation by exercising a counter movement and also serves to absorb (by damping within the elastomer) energy generated by continuous vibration so tending to suppress periodic vibrations.

The two annular members 22 and 21 forming the outer part of the cooling element mount are shown in FIGS. 2, 3 and 4, respectively. The member 21 as shown in FIG. 4 consists of a circular metal plate having a central hole 31 of large enough diameter to permit the adaptor 30 and the inner part 23 to extend through this hole 31. The annular plate 21 also includes bolt holes 32 for attaching the cooling element mount to the dewar mount 13 and bolt holes 33 for securing the members 21 and 22 together by bolts 34. Only one of the bolts 34 is illustrated in FIG. 1.

The member 22 has a hole 35 which is similar in size to the hole 31 of the member 21. The member 22 is also recessed to form an annulus in the form of rim 36 with an inwardly extending flange 37. Threaded bolt holes 38 are present in the rim 36, and the bolts 34 are screwed into these holes 38 to secure the members 21 and 22 together to form the outer part of the cooling element mount.

Figure 5:
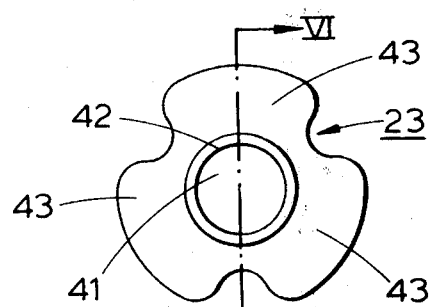
FIG. 5 is a plan view of the inner part of the cooling element mount shown in FIG. 1.
Figure 6:
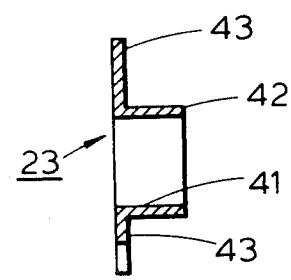
FIG. 6 is a cross-sectional view of the inner part taken on the line VI—VI of FIG. 5.

The inner part 23 of the cooling element mount, as shown in FIG. 5, comprises an annulus 42 which constitutes a rim around a large central hole 41 in which the adaptor 30 is to be accommodated. The member 23 further comprises a flange 43 extending outwardly from the annulus 42. The outline of the flange 43, which is shown in FIG. 5, is similar to but smaller than the outline of the recess in the member 22 as shown in FIG. 2. In the assembled cooling element mount illustrated in FIG. 1, this flange 43, of the inner part 23, extends between the flange 37 of member 22 and the plate 21 secured to the member 22. As illustrated in FIG. 1, all these flanges extend transverse to the longitudinal axis of the cooling element 10. Such an arrangement of flanges can provide an elastic coupling through the material 24 over large surface areas of the inner and outer parts 23 and 21,22 respectively of the cooling element mount. This can provide very efficient damping of vibrations which may affect the movement of the cooling element 10 during use of the detector. These transverse flanges can also provide a further restraint on the movement of the inner part 23 in the longitudinal direction of the cooling element 10 so facilitating accurate longitudinal location of the inner part 23 and of the cooling element 10 mounted thereon within the dewar chamber. The use of the plate 21 in addition to the member 22 provides a comparatively easy way of both forming a shell around the inner part 23 of the cooling element mount and attaching the cooling element mount to the dewar mount 13.

Figure 7:
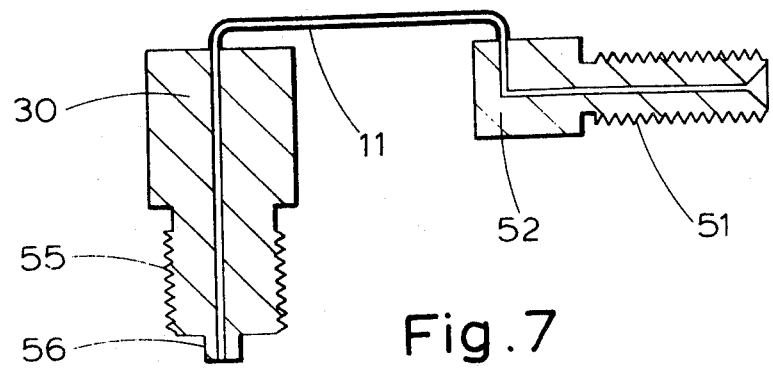
FIG. 7 is a cross-sectional view of a fluid-inlet, pipe and adaptor assembly shown in FIG. 1.
Figure 8:
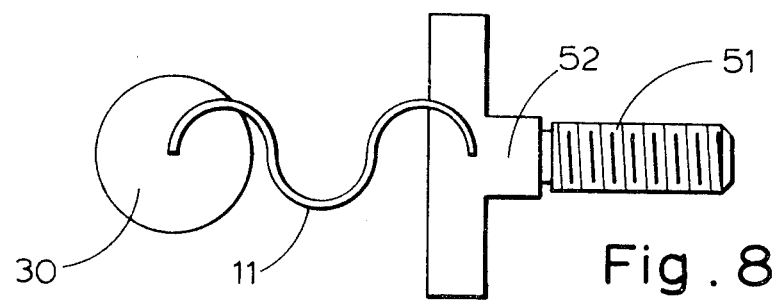
FIG. 8 is a plan view of the assembly of FIG. 7.

Instead of having a long flexible pipe for connecting the cooling element 10 to the fluid supply, the envelope arrangement of FIG. 1 has a further advantage of a rigid inlet connector 51 with an inlet port 52 present on the outer part 21,22 of the cooling element mount. The flexible pipe 11 extends from the inlet port 52 to the adaptor 30 on which the cooling element 10 is secured. This fluid inlet 51,52 is formed by a member which is bolted or otherwise secured to a flat edge 53 of the member 22 shown in FIGS. 2 and 3. The inlet 51,52, flexible pipe 11 and adaptor 30 form a separate subassembly of the envelope arrangement, and this is illustrated in FIGS. 7 and 8. The inlet member 51,52, the flexible pipe 11 and the adaptor 30 may all be made of for example stainless steel. The inlet connector 51 may have an external screw thread for connection to another pipe which is connected at its opposite end to a supply of the cryogen fluid. The pipe 11 is a high pressure pipe which may have an external diameter of for example 1 mm. and a wall thickness of for example 0.15 mm. As illustrated in FIG. 8 the pipe 11 is of such a length and is so arranged as to have bends along its length when the adaptor 30 is mounted in the inner part 23 of the cooling element mount and the inlet member 51,52 is attached to the outer part 21, 22 of the cooling element mount. These bends are to ensure free flexure of the pipe 11 in the envelope arrangement.

The adaptor 30 has an externally threaded portion 55 onto which the end of the cooling element 10 is screwed so that the pipe 11 in the adaptor 30 communicates with the helically wound tubing of the element 10 when the element 10 is mounted on the adaptor 30.

In FIG. 1 the cooling element 10 and the sub-assembly of adaptor 30, pipe 11 and inlet member 51,52 are shown in side view rather than in cross-section, for clarity of the drawing. The adaptor 30 is secured in the aperture 41 of the inner mount 23, for example by an epoxy adhesive. The aperture 41 and the adaptor 30 have a substantially uniform cross-section over at least part of their length so that the adaptor 30 can be secured in the aperture 41 over different distances along its length. This distance determines how far the cooling element 10 extends towards the mounting area 4 of the detector element 3. The ability to adjust this distance by sliding the adaptor 30 in the aperture 41 before securing is an important advantage of this arrangement. If the free end of the cooling element 10 is too close to the dewar end face 4 it may damage the end face 4. If however the free end of the cooling element 10 is too remote from the dewar end face 4 its cooling effect on the detector element 3 will be reduced.

It should also be noted that the cooling element 10, cooling element mount 21,22,23,24, and adaptor/pipe-/inlet sub-assembly 30,11,51,52, can be assembled together to form a unit which can be tested before being inserted in the dewar 1,2 and secured to the dewar mount 13.

Figure 9:
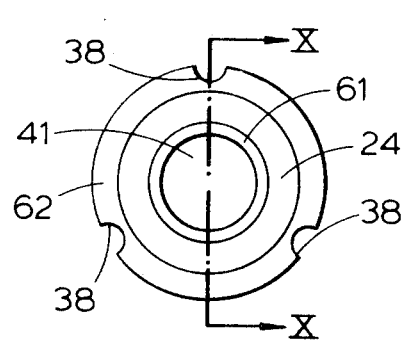
FIG. 9 is a plan view of part of another cooling element mount according to the invention.
Figure 10:
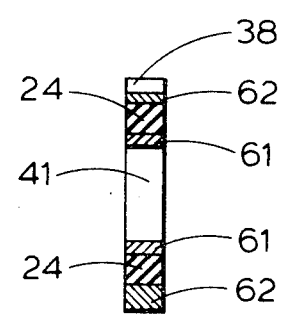
FIG. 10 is a cross-sectional view of the part of FIG. 9, taken on the line X—X of FIG. 9.
Figure 11:
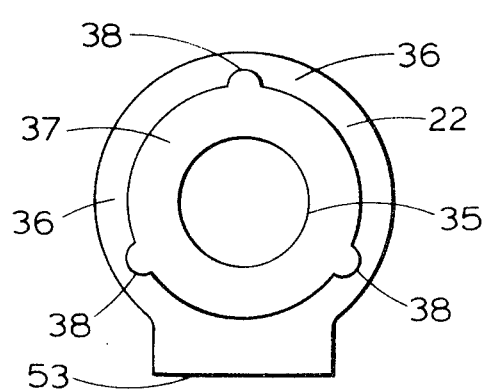
FIG. 11 is a plan view of a modification of the member of FIG. 2 which is suitable for use with the FIGS. 9 and 10 assembly.

In the arrangements of FIGS. 1 to 8 the elastic coupling in the cooling element mount 21,22,23,24 is primarily between the flanges 43,37 and 21. Elastic coupling also occurs between the concentric annuli 36 and 42 of the outer and inner mount parts 22 and 23. The axis of each of these annuli 36 and 42 extends substantially parallel to the longitudinal axis of the elongate cooling element 10. In a modified cooling element mount, also in accordance with the invention, no transverse flanges are present and the elastic coupling between the inner and outer parts of the cooling element mount occurs wholly between two such annuli. Such a concentric ring configuration is illustrated in FIGS. 9 and 10 and may be much cheaper to manufacture. In this case the inner part of the cooling element mount consists of the ring 61, whereas the outer part of the cooling element mount includes the ring 62. The rings 61 and 62 are coupled by resilient material 24 which is bonded to each. The outer ring 62 may be secured for example by an epoxy adhesive in a modified form of the outer part member 22 which is illustrated in FIG. 11. This modified member 22 has a wholly circular rim 36 with half of each bolt hole 38 in the rim 36 and half in the ring 62. Thus the assembly of members 61, 24, 62 and 22 can be bolted to the plate 21 which can be bolted in the same way as in FIG. 1 to the dewar mount 13. In a further modification of the cooling element mount which is also in accordance with the invention, the outer ring 62 is sufficiently wide to have the same outer diameter as the plate 21 of FIG. 4 and to include the bolt holes 32 for securing ring 62 to the dewar mount 13. In this case the modified cooling element mount 61,24,62 is attached directly to the dewar mount 13 without using any members 21 and 22.

It will be understood that many other modifications are possible within the scope of the present invention. Thus in a different detector, for example, an adaptor 30 may form the inner part of the cooling element mount without requiring a separate inner member 23. In this case the adaptor 30 is directly coupled by resilient material 24 to the outer part of the cooling element mount.

In many applications the cooling element 10 and the adaptor 30 may be formed as an integral member so that no separate adaptor 30 is used. If in this case no separate inner member 23 is used the inner part of the cooling element mount would be formed by a mounting surface of the cooling element which would be directly coupled by resilient material 24 to an outer member of the cooling element mount. However preferably use is made of an inner member of the cooling element mount separate from the cooling element and preferably in such manner that the longitudinal location of the cooling element in the dewar can be adjusted prior to being secured.

In the embodiments so far described the elastic coupling was provided by a different resilient material 24 between the inner and outer parts of the cooling element mounting unit. However the unit may be a single member formed of a single material (for example a plastics material) which is so dimensioned and shaped as to have a resilient part integral with and located between the inner and outer parts thereby providing the required elastic coupling between these parts.

The cooling element 10 need not be a Joule-Thomson cooler, but may be for example an element used for so-called liquid-transfer cooling. In this case the element may comprise an assembly of two straight concentric tubes which extends into the inner chamber of the dewar 1,2. The fluid, which may be, for example, liquified nitrogen or liquified dry air, is fed into the inner chamber via the inner tube along which it is transported in droplet form towards the end face 4 of the dewar 1,2. The fluid is vented through the outer tube which usually contacts the inner wall 1 of the dewar 1,2 via for example rubber sealing rings. Another possible form of cooling element with which the invention may be used is an element used for so-called bulk liquid cooling which may comprise a single tube extending into the inner chamber of the dewar 1,2 for introducing liquid cryogen in contact with the end face 4. Such a single tube may or may not contact the inner wall 1 of the dewar 1,2, for example via a rubber sealing ring.

I claim:

1. An envelope arrangement for an infrared detector comprising:
    a mounting area in a dewar for mounting at least one detector element for detecting infrared radiation;
    an elongate cooling element insertable in the dewar so as to extend towards said mounting area for cooling the detector element during operation;
    a dewar mount in which the dewar is at least partially accommodated; and cooling element mounting means for securing the cooling element in the dewar, said cooling element mounting means having an inner part and an outer part which are elastically coupled together by an intermediate resilient part, the cooling element being mounted at said inner part, said cooling element mounting means being detachably connected to the dewar mount via said outer part, and the elastic coupling serving to control movements of the cooling element within the dewar.

2. An arrangement as claimed in claim 1, further comprising:
a flexible pipe connected to the cooling element for supplying fluid to the cooling element; and
a fluid inlet, present on said outer part of the cooling element mounting means, said flexible pipe extending between said outer and inner parts to connect said inlet to said cooling element.

3. An arrangement as claimed in claim 2, further comprising an adaptor, secured in an aperture of said inner part, on which the cooling element is mounted, and wherein said flexible pipe extends from said inlet to said adaptor.

4. An arrangement as claimed in claim 3, wherein said aperture in said inner part and said adaptor have a substantially uniform cross section over at least part of their length so that the adaptor can be secured in the aperture over different distances along its length to determine how far the cooling element extends towards the mounting area of the detector element.

5. An arrangement as claimed in claim 1, 2, 3 or 4, wherein both said outer and inner parts of the cooling element mounting means comprise an annulus, the axis of each annulus extending substantially parallel to the longitudinal axis of the elongate cooling element, and the annuli are arranged substantially concentrically and are elastically coupled together by resilient material provided therebetween.

6. An arrangement as claimed in claim 5, wherein said outer and inner parts of the cooling element mounting means each comprise a flange which projects transverse to the longitudinal axis of the elongate cooling element, which flanges are arranged in overlapping relationship and are elastically coupled together by resilient material provided therebetween.

7. An arrangement as claimed in claim 6, wherein said outer part of the cooling element mounting means comprises two such flanges between which said flange of said inner part extends and is elastically coupled to each.

8. An arrangement as claimed in claim 7, wherein one of said two flanges of said outer part is provided by an annular plate which is attached to the dewar mount.

9. An infrared detector comprising an envelope arrangement as claimed in claim 1, 2, 3 or 4, wherein at least one detector element for infrared radiation is mounted at the mounting area of the dewar.

* * * * *